May 11, 1965  J. R. FRYAR  3,182,434
GLYCOL-GAS SEPARATOR SYSTEM AND METHOD
Filed Oct. 23, 1961
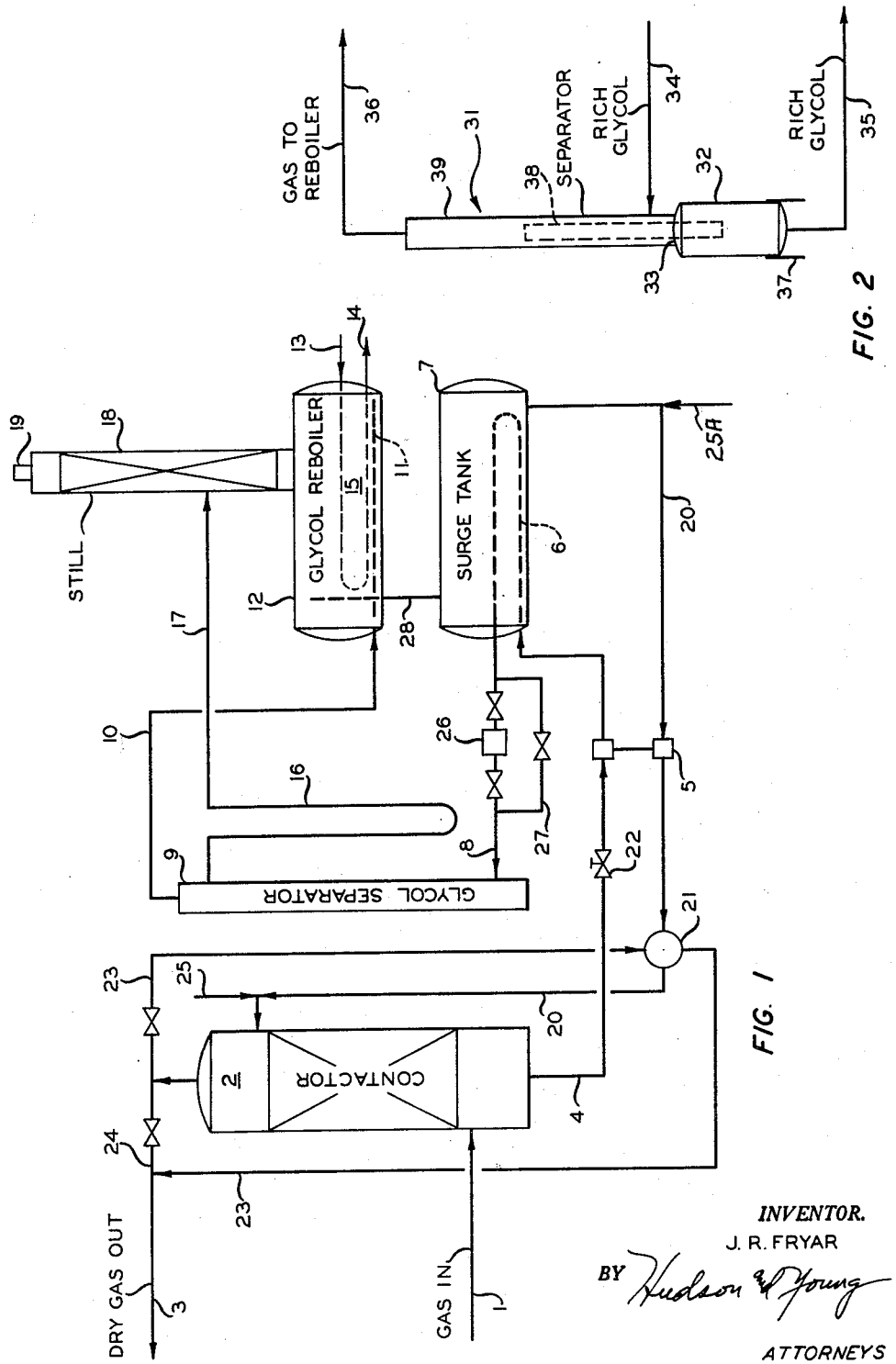
INVENTOR.
J. R. FRYAR
BY *Hudson & Young*
ATTORNEYS

United States Patent Office 3,182,434
Patented May 11, 1965

3,182,434
GLYCOL-GAS SEPARATOR SYSTEM
AND METHOD
Jack R. Fryar, Bartlesville, Okla., assignor to Phillips
Petroleum Company, a corporation of Delaware
Filed Oct. 23, 1961, Ser. No. 146,863
8 Claims. (Cl. 55—32)

This invention relates to dehydration of moisture-containing gases. In one aspect it relates to a method and apparatus for dehydrating moisture-containing natural gas. In another aspect it relates to a method and apparatus for dehydrating a moisture-containing natural gas requiring a minimum of apparatus parts and not requiring an extraneous wet absorbent stripping agent.

In some natural gas dehydration plants ethylene glycol has been used as the dehydrating agent since its use is applicable in cyclic processes. Such cyclic operation, as is well known, involves contacting the moisture-containing gas with relatively dry ethylene glycol and then removing the absorbed moisture or regenerating the moisture-containing absorbent for reuse. Conventional stripper stills employing a stripping gas separated from stripper-still feed, prior to stripping, require a back pressure regulator on the separator to maintain sufficient pressure therein to maintain flow of separated liquid to a proper feed level in the stripping still. Also, the flow of liquid to the still is regulated by a liquid level controller in conjunction with the phase separator. Furthermore, while the back pressure regulator maintains pressure for promoting flow of separated liquid to the stripper still, it also regulates the flow of the separated gas as the stripping gas to the kettle section of the stripper.

An object of this invention is to provide a relatively simple method and apparatus for dehydrating wet gases requiring a minimum of apparatus. Another object of this invention is to provide a method and as simple and inexpensive apparatus as possible for dehydrating moisture-containing natural gas. Still another object of this invention is to provide a method and an apparatus which eliminate the use of the above-mentioned back pressure regulator and liquid level controller apparatus which are normally used for controlling of feed to the stripper still. Other objects and advantages of this invention will be realized upon reading the following description which, taken with the attached drawing, forms a part of this specification.

In the drawing, FIGURE 1 illustrates in diagrammatic form an arrangement of apparatus parts for carrying out the method of this invention. FIGURE 2 illustrates in detail an alternate embodiment of a portion of the apparatus of FIGURE 1.

In the drawing, a conduit 1 leads a wet natural gas from a source, not shown, into the lower portion of a gas-liquid contactor vessel 2. This contactor vessel is equipped with gas-liquid contact promoting apparatus, not shown. Such apparatus can be bubble cap trays or it can be other packing such as broken ceramic pieces, Raschig rings or the like. A conduit 4 leads absorbent loaded with moisture from contactor vessel 2 to the prime mover end of a pump 5. This conduit leads on to end of a heat exchanger coil 6 positioned in a heat exchanger vessel or tank 7. A manually operable valve 22 regulates the rate of flow of motive fluid to the power side of the pump. A conduit 8 communicates the other end of heat exchanger coil 6 with an upright gas-liquid separator vessel 9. A filter 26 is provided for removing solid material entrained in the absorbent prior to its entry into the separator. A by-pass conduit 27 is provided for use at such times that filter 26 is removed from the system for cleaning or replacement. A conduit 10 conducts separated gas from separator vessel 9 to the lower portion of a reboiler vessel 12. This conduit terminates within vessel 12 as a sparger or spray tube 11 for distributing the gas throughout the lower portion of the vessel. A conduit 17, provided with a gas trap 16, conducts by gravity flow liquid separated from gas into the feed level of a stripping still 18. Stripping still 18 is provided at its uppermost end with an outlet 19 for passage of water vapor and stripping gas therefrom. Liquid introduced into still 18 is stripped of its moisture content and flows downward from the feed level into the reboiler vessel 12 from which it passes through a conduit 28 into the aforementioned heat exchanger vessel 7. Steam or other source of heat for reboiling purposes is introduced into a heat exchange reboiler coil 15 by way of a conduit 13 while a conduit 14 is provided for outlet of the heating medium. From the heat exchanger vessel 7 heat-exchanged lean absorbent passes through a conduit 20 and through the pump end of pump 5 and on into the upper portion of contactor vessel 2. A conduit 25 is provided for addition of make-up desiccant as required. The overhead outlet of contactor vessel 2 communicates with a valved conduit 24 and with a valved conduit 23. The valve in conduit 24 is closed and the valve in conduit 23 is opened in case the overhead gas from contactor 2 is used for cooling the lean absorbent in a heat exchanger 21. The gas effluent from heat exchanger 21 passes on through conduit 23 and is removed from the system through conduit 3 for disposal as desired. In case this treated or dehydrated gas from contactor 2 is not required for heat exchange purposes, the valve in conduit 23 is closed while the valve in conduit 24 is opened, allowing for immediate passage of the treated and dehydrated gas from the system through conduit 3.

In FIGURE 2 of the drawing is illustrated in detail an alternate embodiment of separator vessel and gas trap combined. This vessel and gas trap is constructed with an enlarged vessel section or lower vessel 32 having both ends closed. A tube or overflow pipe 38 extends from an upper vessel 39 through the upper wall 33 of the lower vessel 32 into said lower vessel. This upper vessel 39 is the actual gas-liquid separator because liquid introduced into this upper vessel 39 through conduit 34 allows gas to separate from liquid with the gas being withdrawn through an overhead conduit 36 while the separated liquid flows downward through the overflow pipe 38 into the lower vessel 32. From this lower vessel the liquid flows through a conduit 35 into a stripping still, not shown in FIGURE 2. The length of the overflow pipe 38 extending into the upper separator vessel 39 and legs 37 supporting this combined vessel are so proportioned that the top end of the overflow pipe 38 is positioned at about the level of feed introduction into the stripping still. This pipe 38 is so positioned that liquid separated in the upper separator 39 will flow by gravity flow through the lower vessel 32 and through conduit 35 into the stripping still without use of a pump. While this liquid flow is substantially by gravity flow, some slight pressure is maintained in the separator vessel 31 because of the slight head of gas required for passage through conduit 10, through the sparge tube 11, and into the liquid maintained in the reboiler 12, illustrated in FIGURE 1.

As an example of the use of the apparatus and method of this invention, 15,000,000 standard cubic feet per day of a moisture-containing gas is passed into contactor 2 in countercurrent contact with lean or moisture-lean ethylene glycol as an absorbent. On flowing downward through contactor 2, the ethylene glycol dehydrates the gas by absorbing moisture therefrom and the moisture-laden absorbent passes through conduit 4 and through the manually operable valve 22 to the power end of a Kimray glycol pump. Such a pump as suitable for use in the process of this application is manufactured by Kimray, Inc., Oklahoma City, Oklahoma, and is described in a catalog having a price list, Catalog No. 59, effective July 15, 1959, of said Kimray, Inc., as a glycol pump. The moisture-rich glycol is heated in heat exchange coil 6 and is passed through filter 26 or through by-pass conduit 27 into the glycol separator 9. When treating this 15,000,000 standard cubic feet of gas at about 90° F. and at about 600 p.s.i.g. (pounds per square inch gauge) pressure, some appreciable volume of gas dissolves in the absorbent. This gas is separated from the absorbent in separator vessel 9 and is passed from separator 9 on through conduit 10 and through sparge tube 11 into the kettle section of the stripper. Also, in such operation of contactor vessel 2, this vessel is operated liquid empty, that is, a level of liquid is not maintained in the bottom of the vessel and all of the liquid entering the vessel as lean absorbent is removed therefrom through conduit 4 without maintenance of a body of liquid therein. Since this contactor is so operated, a slug of gas being treated flows through conduit 4 along with the rich glycol. The amount of fluid flowing through conduit 4 is regulated by the manually operable valve 22. Thus, the combined volume of gas absorbed in the glycol passing through contactor 2 and the amount of gas flowing as such through conduit 4 with the rich glycol is regulated by the manually operable valve 22 as mentioned. In this case the amount of gas separated in separator 9 amounted to 840 standard cubic feet per hour and this amount of gas, which in the prior art was lost to the operation, is passed through conduit 10 and through sparge tube 11 as stripping gas for use in stripping the moisture from the rich absorbent in still 18. This 840 cubic feet of gas per hour is about the actual amount of gas required to strip the rich absorbent sufficiently free of moisture that the stripped lean absorbent will reduce the dew point of the moisture-containing natural gas to that required for pipe line purposes. The amount of gas actually separated in separator 9 was 864 standard cubic feet per hour and this amount of gas per hour was slightly greater than that actually required for production of the predetermined dew point of the treated gas flowing through conduit 3.

In the following tabulation, data are given illustrating the operation of this invention when treating 15,000,000 standard cubic feet of gas per day:

| Conduit, vessels | 1 | 3 | 4 | 20 | 10 |
|---|---|---|---|---|---|
| MM, s.c.f.d | 15 | 15 | | | |
| Temperature, °F | 90 | | | | |
| P.s.i.g | 600 | | | | |
| Lbs. H₂O/MM s.c.f | | 6 | | | |
| Glycol, g.p.h | | | 216 | 210 | |
| Gas, s.c.f.h | | | 864 | | 864 |
| Dew point, °F | 90 | 19 | | | |

While ethylene glycol is mentioned hereinbefore, the above tabulation refers to the use of triethylene glycol. The latter is preferred for plant use.

Make-up glycol, or preferably triethylene glycol, is added to the system at a low pressure point, such as by way of a conduit 25A.

While certain embodiments of the invention have been described for illustrative purposes, the invention obviously is not limited thereto.

That which is claimed is:

1. A method for dehydrating a moisture-laden natural gas comprising the steps of:
   (1) contacting said gas with a dehydrating absorbent liquid at superatmospheric pressure in a contacting zone, and absorbing moisture and a minor portion of said gas in said liquid to form a rich liquid;
   (2) recovering the dried gas from step (1) as a product;
   (3) passing the rich liquid from step (1) thru the prime mover end of a pumping zone so as to expand same and simultaneously pump lean liquid from a surge zone to said contacting zone;
   (4) passing said rich liquid from step (3) thru said surge zone in indirect heat exchange with said lean liquid so as to heat said rich liquid and cool said lean liquid;
   (5) passing the heated rich liquid from step (4) into a lower level of a gas-liquid separation zone so as to separate a portion of the absorbed gas and moisture vapor therefrom in the upper end of said separation zone and less-rich liquid in the lower end thereof;
   (6) passing less-rich liquid from step (5) by gravity flow to an intermediate section of an upright stripping zone communicating with a subjacent reboiler zone of substantially greater horizontal cross section than said stripping zone to cause said less-rich liquid to flow downwardly toward said reboiler zone;
   (7) dispersing said gas from step (5) upwardly thru substantially the entire mass of boiling liquid in said reboiler zone and then thru said stripping zone to strip additional moisture and gas therefrom to provide lean liquid in said reboiler zone;
   (8) venting said gas and moisture vapor from the upper section of said stripping zone; and
   (9) passing hot lean liquid from said reboiler zone to said surge zone for heat exchange with said rich liquid in step (4).

2. The process of claim 1 wherein said dehydrating liquid is a glycol.

3. The process of claim 2 wherein said glycol is ethylene glycol.

4. The process of claim 1 wherein said heated rich liquid in step (5) is passed to said separation zone against a head of liquid therein and the level of liquid in said separtion zone is above the level of the feed point of said liquid to said stripping zone.

5. The process of claim 1 wherein said contacting zone is operated so that slugs of gas pass with the rich liquid in steps (3) and the flow in step (3) is controlled so as to supply the entire stripping requirements in step (7).

6. An apparatus comprising in combination:
   (1) a gas-liquid contacting vessel having means for passing wet gas upwardly therethrough and a dehydrating liquid downwardly therethrough;
   (2) a fluid-actuated pump having a prime mover circuit and a pumping circuit;
   (3) a first conduit connecting the lower section of the vessel of (1) with said prime mover circuit;
   (4) a surge tank for lean liquid having an inlet and an outlet for lean liquid and a tubing circuit therein for rich liquid;
   (5) a second conduit connecting the prime mover of (2) with one end of the tubing circuit of (4);
   (6) an upright gas-liquid separator having an inlet for rich liquid, an outlet in the top section for gas, and an outlet for less-rich liquid;
   (7) a third conduit connecting the other end of said tubing circuit with the rich liquid inlet of (6);
   (8) a still comprising an upright stripping section having a feed inlet in an intermediate section and a subjacent horizontally elongated reboiler having an inlet in a lower section terminating in a sparger extending horizontally along the bottom thereof and an outlet;
   (9) a fourth conduit connecting the liquid outlet of (6) with the feed inlet of (8), said feed inlet being substantially below the level of the top of said separator and below a liquid operating level therein;

(10) a fifth conduit connecting the gas outlet of (6) with the sparger of (8);

(11) a sixth conduit connecting the outlet of (8) with the inlet of (4); and

(12) a seventh conduit connecting the outlet of (4) with the pumping circuit of (2).

7. The apparatus of claim 6 wherein the inlet of (6) is in a lower section and the liquid outlet is in an intermediate section.

8. The apparatus of claim 6 wherein (6) comprises an elongated upper section; a bottom section of larger diameter than the upper section; an overflow tube extending from said bottom section to an intermediate selected overflow level in said upper section, there being a seal between said upper section and said bottom section except through said tube, the rich liquid inlet being in said upper section positioned below the top of said tube, and said less rich outlet being in said bottom section.

References Cited by the Examiner

UNITED STATES PATENTS

| 2,428,643 | 10/47 | Young | 55—32 |
|---|---|---|---|
| 2,781,863 | 2/57 | Bock et al. | 55—56 |
| 2,812,830 | 11/57 | Sattler et al. | 55—89 |
| 2,988,171 | 6/61 | Arnold et al. | 55—32 |
| 2,990,910 | 7/61 | Kimmell | 55—32 |
| 3,001,604 | 9/61 | Worley | 55—32 |
| 3,009,537 | 11/61 | Glasgow et al. | 55—174 |
| 3,094,574 | 6/63 | Glasgow et al. | 261—114 |
| 3,104,958 | 9/63 | Smith et al. | 55—40 |
| 3,105,748 | 10/63 | Stahl | 55—32 |
| 3,119,674 | 1/64 | Glasgow et al. | 55—32 |

GEORGE D. MITCHELL, *Primary Examiner.*

HERBERT L. MARTIN, REUBEN FRIEDMAN,
*Examiners.*